United States Patent [19]

Maclaren

[11] 3,968,991
[45] July 13, 1976

[54] COLLAPSIBLE SEAT STRUCTURES

[75] Inventor: Owen Finlay Maclaren, Barby, near Rugby, England

[73] Assignee: Gannet Holdings Limited, Guernsey, Guernsey (Channel Is.)

[22] Filed: Oct. 25, 1973

[21] Appl. No.: 409,590

[30] Foreign Application Priority Data
Nov. 1, 1972 United Kingdom............... 50331/72
Mar. 2, 1973 United Kingdom............... 10246/73

[52] U.S. Cl. ................................. 297/45; 248/436; 280/39; 280/42; 280/242 WC; 297/39; 297/42; 297/DIG. 4
[51] Int. Cl.².......................................... A47C 4/28
[58] Field of Search ............ 297/39, 42, 45, DIG. 4, 297/54; 280/39, 242 WC, 36 B, 42; 5/111; 248/155, 172, 173, 188.6, 436; 211/178 R

[56] References Cited
UNITED STATES PATENTS

| | | | |
|---|---|---|---|
| 703,077 | 6/1902 | Nivison............................. | 297/45 X |
| 1,027,692 | 5/1912 | Cole.................................. | 248/436 X |
| 2,460,459 | 2/1949 | Kraska............................. | 297/DIG. 4 |
| 2,485,016 | 10/1949 | Rideout........................ | 297/DIG. 4 |
| 2,665,743 | 1/1954 | Cosper............................. | 297/42 |
| 2,766,813 | 10/1956 | Kay.................................... | 297/54 |
| 3,390,893 | 7/1968 | MacLaren........................... | 280/39 |
| 3,736,021 | 5/1973 | MacLaren........................... | 297/42 |
| 3,836,164 | 9/1974 | Sugino et al. ..................... | 280/42 X |

FOREIGN PATENTS OR APPLICATIONS

| | | |
|---|---|---|
| 2,782,268 | 3/1928 | Canada |
| 233,478 | 8/1923 | Canada |
| 257,715 | 2/1926 | Canada |
| 635,530 | 4/1950 | United Kingdom................... 297/45 |

Primary Examiner—Roy D. Frazier
Assistant Examiner—William E. Lyddane
Attorney, Agent, or Firm—Stevens, Davis, Miller & Mosher

[57] ABSTRACT

A collapsible volume frame, when erected, presents in each of two opposite side elevations a side space frame defined by four points which if joined would form a quadrilateral; and presents further space frames in the four other aspects. The side space frames are braced by at least one frame element disposed transversely and articulated to them in a triangulated manner. Releasable means resist collapse of the volume frame. These side and further space frames are foldable so that the volume frame when collapsed forms a bundle.

16 Claims, 17 Drawing Figures

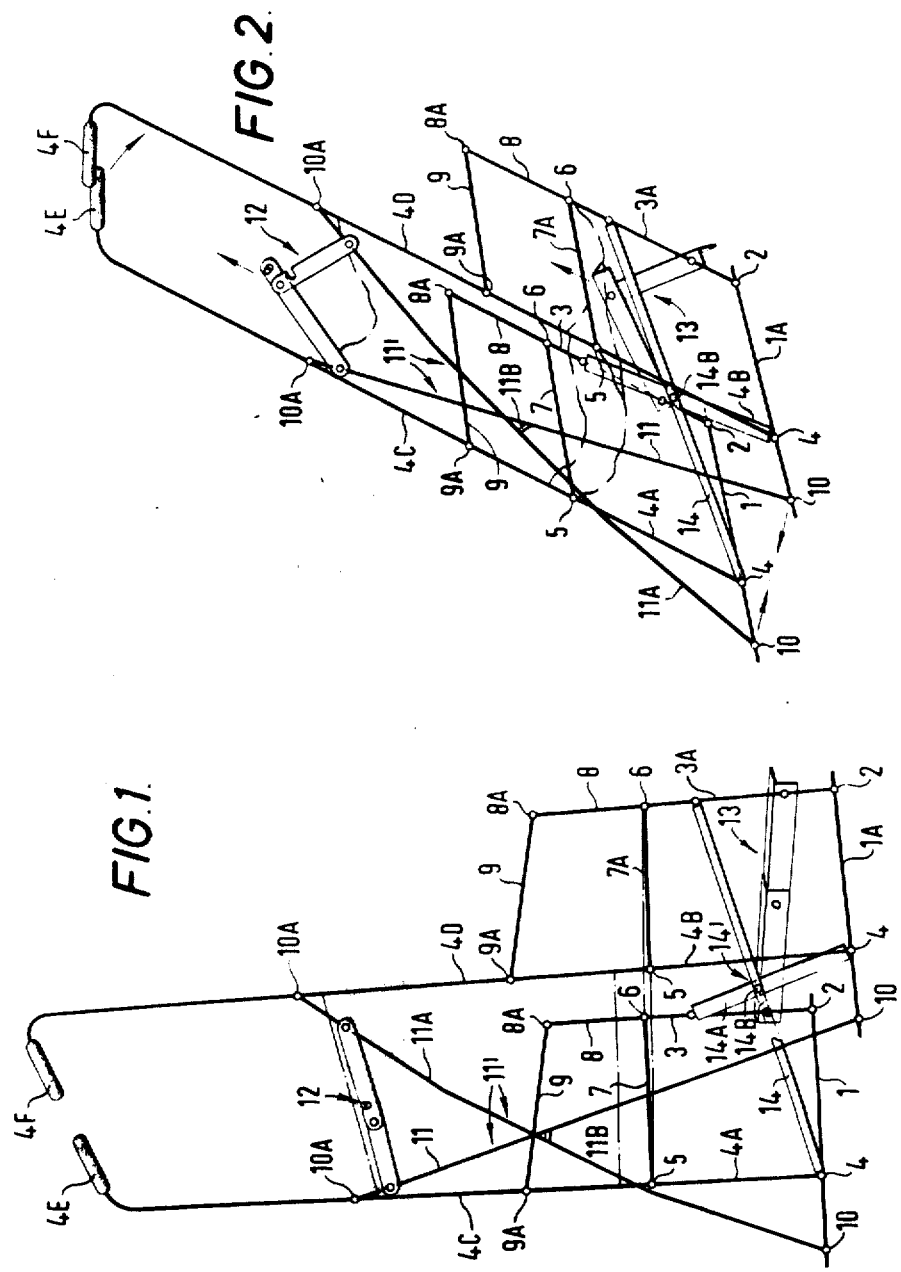

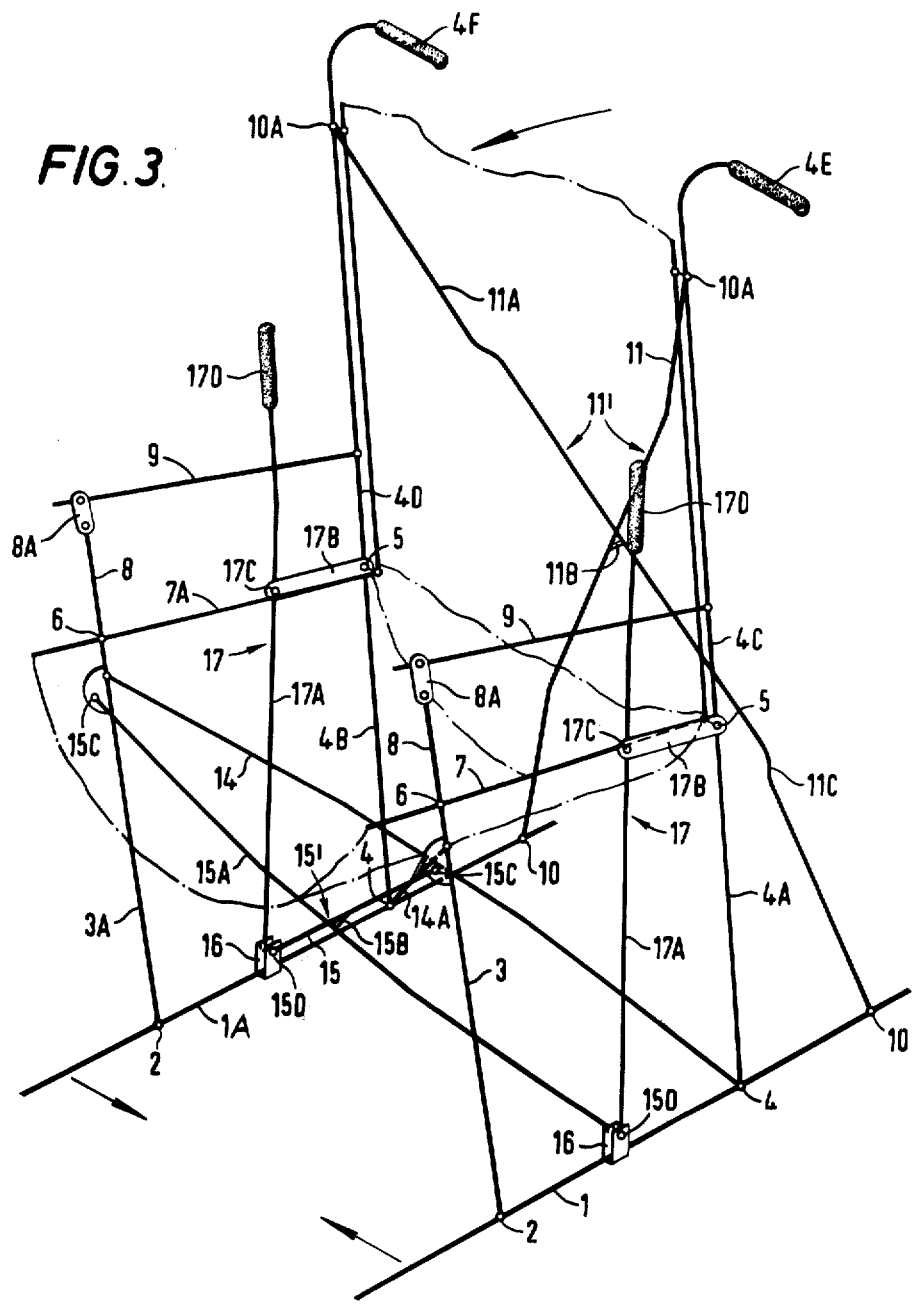

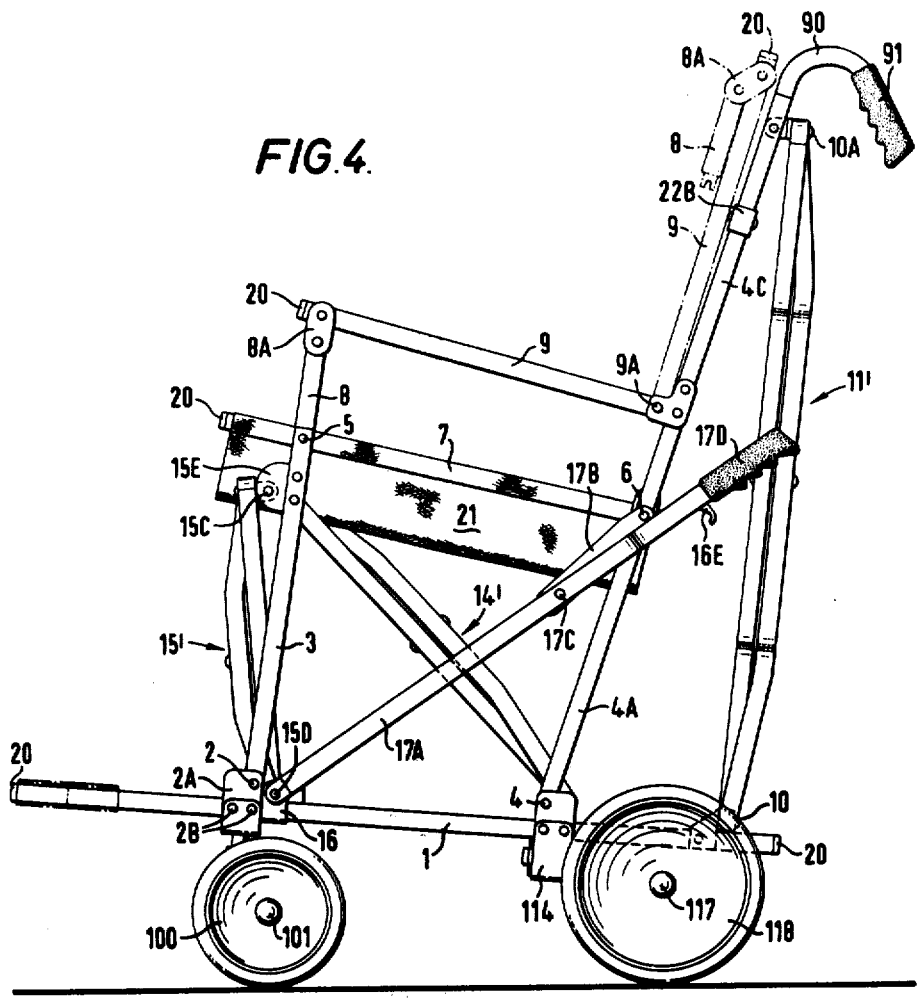

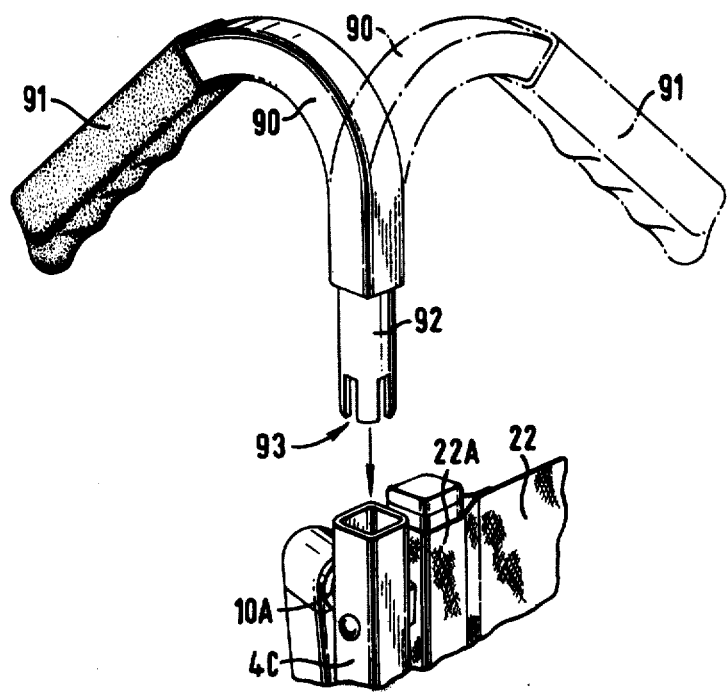

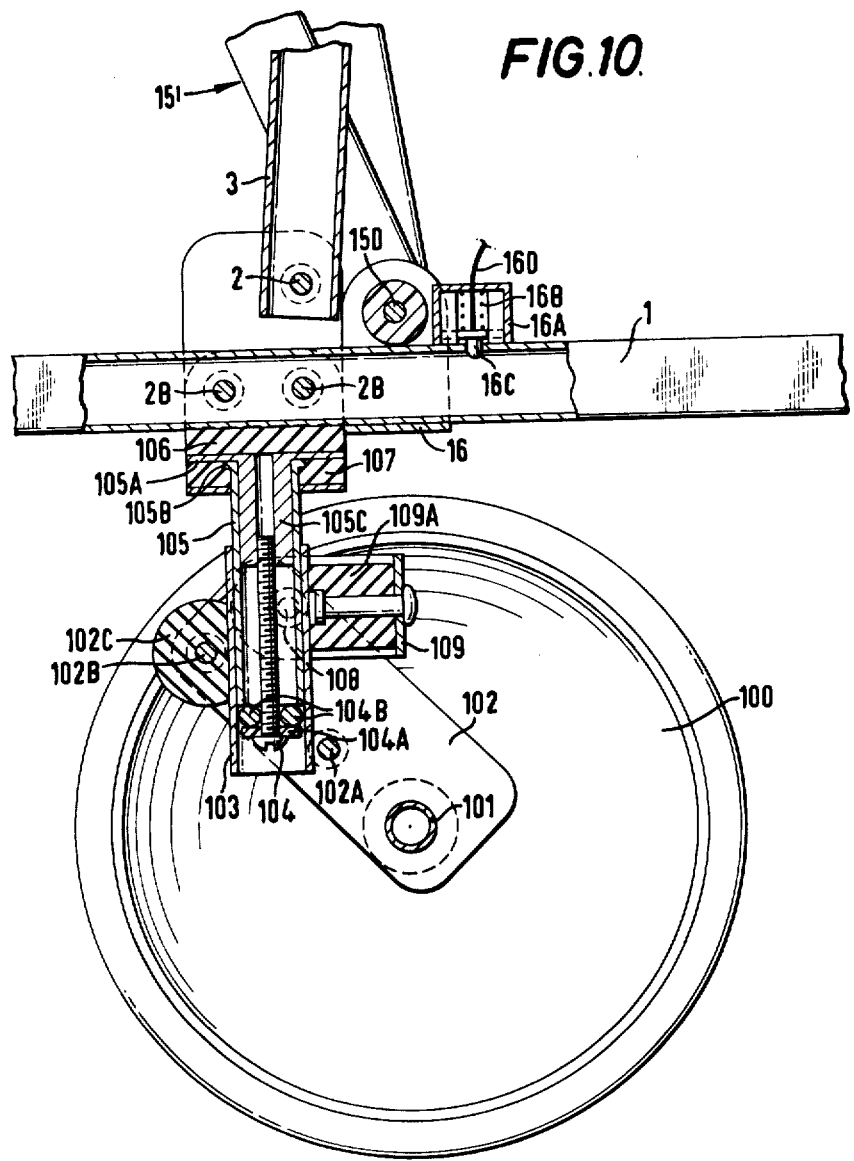

COLLAPSIBLE SEAT STRUCTURES

This invention is concerned with a collapsible structure which when in use constitutes a volume frame suitable for a folding seat or chain, invalid or baby carriage, shopping cart, hospital or ambulance stretcher or other volume frame structure which is required to be rigid and robust when extended and when collapsed occupies dimensions which may be compared to a bundle constituted by the frame elements. To that extent it is to be compared to the subject-matter of United States Patent No. 3,736,021. It is, however, not an improvement in or modification of that example of prior art, but is based on different geometrical considerations. The main aim of the present invention is the provision of a structure, which may be wheeled and for its weight be capable of carrying a heavyweight occupant who may impose thereon considerable loads tending to distort the structure. If the seat is wheeled (as is primarily intended so that it is a chair for an invalid or crippled person) it needs not only to resist loads caused by its occupant but also loads due to uneven ground, or being tilted to cope with a curb or other unevenness of ground. Such conditions, tending to wrack or deform the volume frame structure, may give rise to very considerable forces. The invention provides a collapsible volume frame which when extended is in a high degree resistant to deformation while being very light in weight. To a large extent such lightness is owed to the fact that almost every major load to be met, is met in compression, so that (subject to shear loads on pivots) bending loads are largely absent and each member of the volume frame may be designed with great economy of weight. The resilient mountings of wheels also reduces stresses which tend to overload the structure by yielding to inequalities of the ground. In this specification to avoid repetitious statements it is to be assumed that description refers to the state of the structure when it is extended, i.e. erected, unless the context indicates to the contrary. Where words such as "horizontal" or "vertical" are used, these are generalizations not intended to be precise but only approximate. "Articulated" means pivotally jointed not necessarily only on one axis. Several joints in the structure involve two axes, for constructional reasons such axes often do not intersect but they are near to one another, so that such a joint can for practical purposes be regarded as "universal" i.e. having two degrees of pivotal freedom. Reference is made herewith to X-frames; this means, in each instance, a collapsible assembly of two elongate elements crossing and either interconnected by a single pivot; or rigidly formed or connected at their point of intersection and having four pivots distributed about it, such that, between it and the end of each limb of each bar element is one such pivot, which thereby allows the limb to collapse about the respective pivot. Generally speaking the point of intersection is at the middles of the elements. The word "toggle" is used to indicate a strut-like element which is pivoted between its ends so as to collapse, there being means to prevent it from collapse in one sense, by virtue of abutment, when passed a dead-center condition. In referring to elements or assemblies such as an X-frame, for convenience they are referred to as lying in a plane; this is an approximation only, since of course such an assembly must in fact have thickness. A "quadrilateral frame" in this specification corresponds in geometric terms to a figure defined by the four points which can be joined to form a quadrilateral, the spacing between which points may be variable; two opposite sides of the quadrilateral; and at least one line joining the sides. Such line may be e.g. a third side, or when there is more than one such line, the lines may intersect or complete the quadrilateral. Finally, whereas the extended structure constitutes a volume or 3 dimensional frame, when folded all the frame parts lie parallel or near-parallel and close together and this condition will be recognizable as a "bundle", which term is used hereinafter. The seat structure referred to herein is not only intended to be applied to a wheeled chair, but also to a folding seat or chain without wheels or some form of runner other than wheels, might be applied to it. The structure of the invention will be seen to be considerably different from that earlier Patent mentioned. In that earlier case the basis of structure was in effect a volume frame of triangular prism form. In the present case, in order to enable heavy people to be accommodated in comfort and safety, the structure is in the general form of a quadrilateral prism, i.e. one which geometrically speaking has six quadrilateral plane faces. This form of structure may (as will be seen) be collapsible into a bundle-like pack of relatively small dimensions, but when it is extended it is extremely rigid and robust.

The invention resides in a collapsible volume frame comprising, when erected, a pair of side structures, each structure having a front rigid leg member, a rear rigid leg member and at least one rigid strut member extending fore and aft of the volume frame and pivotally connected to said front and rear leg members so as to permit folding of each side structure in its plane; at least one frame element disposed transversely and articulately connected to leg members so as to brace the side structures in triangulated manner, at least one releasable means pivotally connected between legs to resist approach of such legs toward each other until release whereby upon release the said legs can move toward each other and simultaneously fold to collapse the entire volume frame.

In one preferred form of the volume frame, which can be applied to a folding seat, preferably fitted with wheels, which is collapsible from a volume-frame to a bundle-like pack, the volume frame comprises pivotally interconnected elements in the general form of a prism of which each plane is quadrilateral (that is, the prism has a six-faced configuration) at least one X-frame pivotally connecting diagonally opposite pairs of elements (e.g. right front and left rear legs) and lying in a plane which is at an angle to all the elements so as diagonally to brace the volume frame, and at least one collapsible strut capable of holding apart a pair of parallel elements in the plane in which lie the X-frame and the elements, so as to hold apart the two parallel space frames, normal to such mutual plane, of which such elements form edges.

Preferably at least two, and even more preferably three such X-frames are provided, at least two of which lie in planes which are at a substantial angle to each other. As will be seen, such X-frames afford very complete diagonal bracing. One of the X-frames above mentioned is, in one form of the invention, connected to a pair of parallel volume-frame elements through slides which move along these elements when the structure is collapsing or extending.

In one preferred form of the invention, the volume frame is held extended by a pair of diagonal collapsible toggle struts which include extensions forming handles and which, when locked over their dead-center, constitute diagonal braces of two parallel, laterallyspaced, quadrilateral space frames. In this form, these struts are connected pivotally to the aforementioned slides; means may be provided for positively locking the slides in the extended condition, as will be described.

Another simple form, embodying the invention comprises a structure in which an X-frame interconnects a pair of front legs with a pair of rear legs in a plane which is in effect diagonal as seen in side elevation to the quadrilateral vertical plane figures defined by front and back legs; the front legs are held apart by a front toggle strut; the rear legs are extended upwards to form seat-back parts, and a second X-frame braces the nearly vertical quadrilateral formed by the rear leg and seat-back parts, preferably with a second toggle strut keeping these apart spaced laterally.

Another form of the structure which is collapsible from a volume frame to a bundle-like pack, comprises (when extended) base elements which lie in a horizontal transverse plane, back elements including rear legs which lie in a vertical transverse plane, front legs which also lie in a vertical transverse plane, and seat elements which lie in a horizontal transverse plane all these forming in effect, a quadrilateral pattern of space frames as viewed, for example, in side elevation and being articulately jointed for collapsing by deformation of the quadrilateral space frames, the volume frame being braced by three X-frames respectively articulately and diagonally interconnecting (first) the upper ends of the front legs to the bottom ends of the back elements; (second) near the upper ends of the back elements to the rear ends of the base elements; and (third) the upper ends of the front legs to slides mounted on the base elements, all so that, in side elevation, there is one X-frame plane diagonal to the quadrilateral pattern, a second nearly in the plane of the back elements, and a third nearly in the plane of the front legs. All of the named locations are approximations; in the nature of the pivotal joints used there are small dimensional differences between the strictly geometrically deformable points and the general vicinity of the physical connections.

The locality where the rear legs is jointed to the base elements is spaced forwardly from the locality where the second X-frame is connected to the base elements by a dimension which is critical and is in the appropriate scale, illustrated in FIG. 4 of the drawings described below.

As will become clear, in such a structure, the quadrilateral as seen in side elevation comprises base, back element (lower portion being a leg), seat element, and front leg, and is further braced by diagonal collapsible strut means which include handles the use of which extends and collapses the strut so as to extend or collapse the volume frame in three dimensions.

In some circumstances the slides above mentioned may be undesirable in the structure. Another form of structure embodying the invention accordingly includes no slides but includes an X-frame consisting of two main strut elements which when extended intersect at an axis about which they are angularly relatively movable, and each such element is itself so pivotally jointed in its length that its effective overall length (i.e. the distance between its extremities) shortens when the structure is collapsed, and means are provided whereby the elements when extended are locked against collapse (e.g. by dead-center action) so as to form adequate compression struts.

Stated another way, the latter embodiment comprises a volume frame which is collapsible in all three dimensions and which when extended is braced by at least one X-frame, in which such an X-frame comprises two struts which have pivotal joints in their lengths so that the distance between the ends of each strut is variable during extension or collapsing of the X-frame, the joints being such that they lock when the respective strut is extended so that the strut is then effective as a compression member.

The parts which constitute the elements of the X-frame may include a rotary central star-like element, made for example as a simple casting and having four radial arms a pair of which in alignment constitute part of one element (and alternatively the other pair pertains to the other element) so that rotation of the star "breaks" both strut elements. In this example, the X-frame is controlled in extension or collapse, by rotating the star. In this form of the invention the space-frame which is held extended by the X-frame, may be such that the parts which are interconnected by the X-frame do not (as in some other examples) simply approach and recede during folding and extension in a parallel manner but move through an angle and also longitudinally relatively to each other.

In essence each strut element of an X-frame (not including the central star abovementioned star frame) of the invention consists of three parts; there is a basic X-frame having interpivoted crossing parts, and the radially outer ends of each such crossing part are pivoted each to an outer link-strut which in its turn is pivotally connected to the space frame which when extended is to be braced by the X-frame.

In addition, the X-frame as above constituted, when extended, is preferably locked by a two-piece toggle bar with its own dead-center locking arrangement. Then straightening and locking of the toggle bar extends and locks the X-frame.

Further, the link-struts are preferably interconnected by further links so arranged that in collapse or extension the angular movement of each link strut is correlated positively with the corresponding movement of its opposite link-strut.

The volume frame structure may include means which provide that the structure, when held extended in use by a plurality of X-frames, is operable as to extension and collapse by one control element.

The invention may be applied for example to a folding chair, in which case the volume frame structure is held extended (and may in fact be finally extended) by the weight of its occupant. Thus an invalid chair or wheel-chair may be so contrived that (it being easy to extend it nearly fully) final extension and locking is effected by the act of sitting in it and when thus occupied it is practically impossible for the volume frame to fold; thus the invention can be even more safe against inadvertence or the inexpert operation of an elderly person, than in dependence on a complete and perhaps forceful manipulative action. In this feature of the invention there is provided mechanical connection between seat-bearer elements and the X-frame elements which extend and finally lock the volume frame such that weight on the seat finally locks at least one X-frame.

It may be convenient to incorporate the last mentioned two features (single operational control and seat weight) in one and the same structure and for the sake of convenience this is what will be described, it being understood that neither of these features are essential to the invention.

The structure may include a number of further details, such as partly rermovable arm rests, variable handles for pushing, resilient wheel attachments and resilient castoring attachments, adjustable wheel base, a removable foot rest, all such as to conduce to comfort for the occupant and avoid excessive disturbing stresses due to uneven ground or standing.

The accompanying drawings illustrate four examples of embodiments of the invention, in which:

FIG. 1 is a line diagram of the wheeled chair structure showing main elements, erected, in a simple form.

FIG. 2 shows the structure of FIG. 1, partially collapsed.

FIG. 3 is a further line diagram of the second more elaborate form (partly collapsed).

FIG. 4 is a side elevation illustrating the more elaborate second form of wheeled chair (to which the embodiment of FIG. 3 corresponds).

FIG. 9 illustrates how a handle may be orientated for comfort or packaging.

FIG. 10 illustrates the resilient suspension of a front, castoring, wheel pair;

FIG. 12 is a line-diagram illustrating a form of collapsible volume-frame suitable for an invalid chair while

For simplicity of description, like parts of the embodiments are given the same references.

Figure 5:
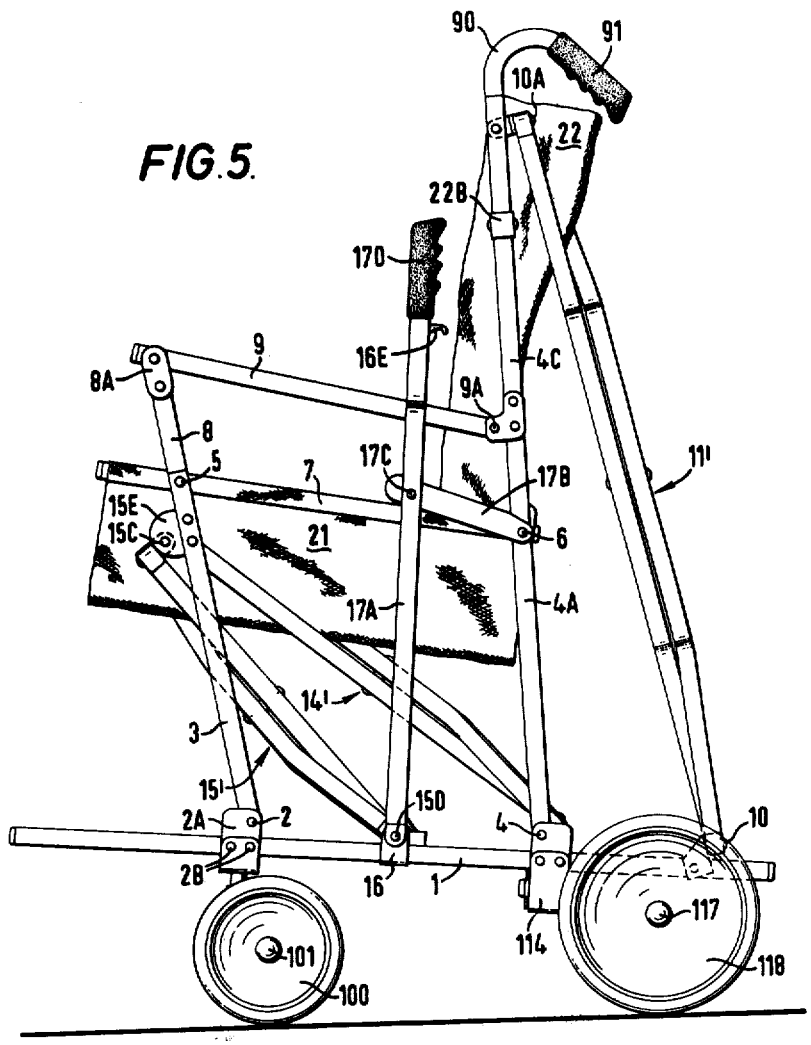
FIG. 5 shows the chair of FIG. 4 partially collapsed (corresponding to FIG. 3).

The simple structure of FIGS. 1 and 2 has two parallel base elements 1, 1A extending from front to rear; as will subsequently be seen these are intended to have wheels attached. Towards the front ends of 1, 1A are pivoted at 2, front legs 3, 3A.

Towards the rear ends of 1, 1A are pivoted at 4, rear legs 4A, 4B. The front legs 3, 3A and rear legs 4A, 4B are interconnected by pivots at 5 and 6, to seat members 7, 7A which are substantially parallel with the base elements 1, 1A; thus 1, 3, 4A, 7 and 1A, 3A, 4B, 7A form a quadrilateral as seen in side elevation. This is not necessarily of equal sides; (compare the two forms of FIGS. 1 and 4). The pivot axes are not congruent but may be spaced by a certain distance, as seen for example in FIG. 4.

The front legs support arm rest assemblies extending upwards from the plane of the seat i.e. of members 7, 7A. The arm rest assemblies consist of vertical parts 8 pivotally and link-jointed at 8A to armrests 9 which in turn are pivoted at 9A to upward extensions constituting seat-back parts 4C, 4D, of the legs 4A, 4B. The parts 4C, 4D at their upper ends have handles 4E, 4F (which may be as described in relation to FIG. 9). The parts 4C, 4D are connected by pivots at 10 to the base elements 1, 1A by an X-frame 11' of which the two rods 11, 11A intersect at their pivot joint 11B and are pivoted at 10A to 4C and 4D.

For brevity, a substructure such as an X-frame will be referred to simply by its numeral; the rods 11, 11A and their pivot attachment will therefore be referred to collectively as "11'". A tie means having two ends of limited separability, exemplified by collapsible toggle strut 12 interconnects the rods 11, 11A near their upper ends (another such strut may be used below the pivot 11B), and another such tie means, collapsible toggle strut 13, interconnects the front legs 3, 3A. When these are extended and locked by their dead-center effect they can hold the whole volume frame in its extended (FIG. 1) condition but when "broken" as seen in FIG. 2, they allow the frame to collapse. They are preferably made of two angle-section elements, interpivoted, the pivot being so centered that they remain in virtual alignment as in FIG. 1 until deliberately "broken" as in FIG. 2.

A second X-frame 14' is seen, comprising elements 14, 14A and pivot 14B. This frame is pivotally connected by its ends, to the front legs 3, 3A near their upper ends and to the rear legs 4A, 4B towards their lower ends (therefore also indirectly to the seat members 7, 7A and base members 1); seen in side elevation the second X-frame 14' appears as approximately diagonal to the aforementioned lateral-view quadrilaterals 1, 3, 4A, 7, and 1A, 3A, 4B, 7A which quandrilaterals it braces.

Turning now to FIG. 3, a quadrilateral prism-formed volume frame is illustrated. In this Figure a third X-frame 15' is to be seen; this consists of the rods 15, 15A, and their pivot interconnection at 15B. The upper ends of this X-frame have pivot joints to the legs 3, 3A, just below the seat elements 7, 7A at 15C. Their lower ends are pivot jointed at 15D to slides 16 which are movable along the base elements 1, between the bottom pivots 2 of the front legs and the bottom pivots 4 of the rear legs. Note that FIG. 3 shows (as at 11C) how the X-frame elements may be joggled or bent so that their intersection does not prevent their relative movement, though they lie for all practical purposes in one transverse plane.

The slides 16 have a second important function. Pivoted to them (at or nearly at 15D) are tie means, having two ends of limited separability, exemplified by two lengths 17A of a pair of toggle struts 17 of which the other parts 17B are relatively short. These struts 17 extend from the slides 16 to the upper ends of the rear legs 4 at or near the pivots 5. The lengths 17A extend beyond the toggle joints (17C) to provide handles 17D; the struts 17 are so jointed at 17C that they lock over a dead-center (see FIG. 4). In addition any other operable lock may be provided for additional safety, such as a plastics-spring latch, or a ring slidable lengthwise on 17A and 17B to hold these together when extended. A positive form of lock is described later (FIG. 10). The geometry and dimensions are such that the struts 17 lock fully extended when the slides 16 are fully forward (as in FIG. 4). The struts 17 then brace the referred-to quadrilaterals diagonally. Thus the quadrilaterals are braced diagonally one way by the third X-frame 15' and the other way by the struts 17. As is shown in FIG. 3 the pivot joints 8A between 8 and 9 are made by short links; this is to allow the detachment which will be described more fully below. In FIG. 3 the arrows between the elements 1 indicate that the base elements 1 approach laterally during collapsing of the volume frame.

Figure 6:
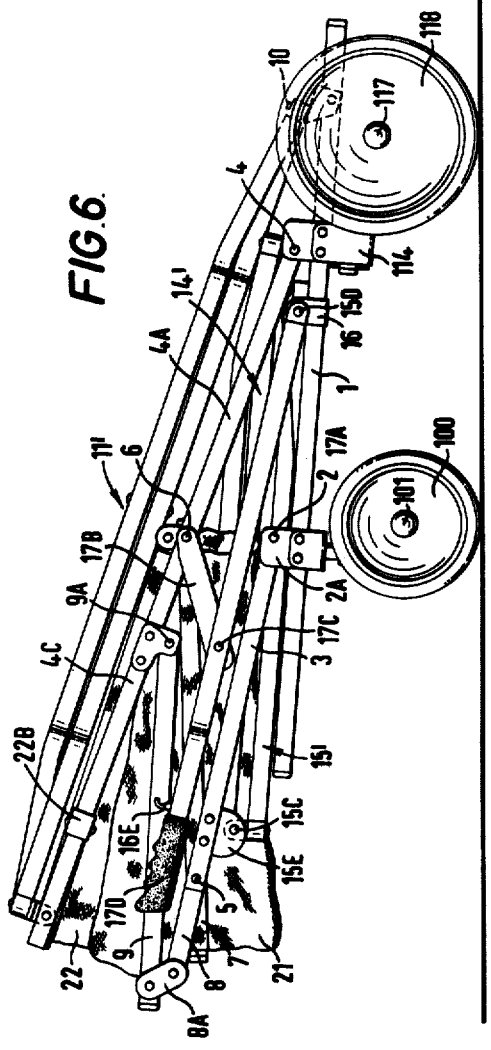
FIG. 6 shows the chair of FIGS. 4 and 5, fully collapsed.

In the form of structure illustrated by FIG. 3, and from FIGS. 4 to 6, it can be seen that collapse and extension of the volume frame is effected basically by manipulation of the handles 17D. If the operator is at the front of the chair he pulls these handles towards him, "breaking" the toggles of which 17A form part; then the volume frame will collapse both back to front and transversely, to the condition which is more explicitly illustrated in FIG. 6, i.e. into a bundle in which all the main elements lie nearly parallel, and therefore in a very compact relationship. During such collapse, the slides 16 move rearwardly taking with them the bottom ends of X-frame 15'.

In describing FIGS. 4 to 11, the parts which correspond to those shown in Figures are given corresponding reference numerals for ease of comparison.

In FIGS. 4, 5, 6, and 7 the invention is illustrated in its intended application, to a folding wheeled chair for adult invalids or cripples. It consists essentially of the collapsible volume frame as in FIG. 3, with wheels and other details.

Figure 8:
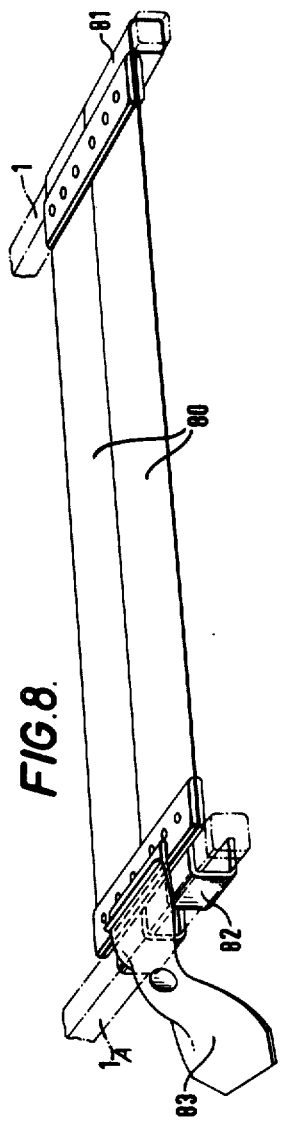
FIG. 8 (on larger scale) illustrates a detachable footrest.

In these Figures the base-elements are seen at 1; they extend forwards beyond the pivots 2 which are borne by brackets 2A fixed on the members 1 which are forwardly extended to allow the attachment of a footrest seen in FIG. 8. This is a pliable strap 80 with a closed looped end at 81 to slide on one member 1 or 1A and a hooked end at 82 to engage on the other member 1, or 1A with a tag 83 to facilitate engagement and disengagement of the hook. On the members 1, 1A behind the bracket 2A and abutting against the bracket in the extended condition (see FIG. 4) are the slides 16. As can be seen by comparison of FIGS. 4, 5, and 6, as the volume frame collapses the slides 16 move rearwards. At the slide pivots 15D are attached the two botton ends of the X-frame 15' of which the top ends are attached at 15C to lugs 15E. The back to front folding takes place about a first plurality of pivot connection means such as pivot points 2, 5, 6 and 4. Front legs 3, 3A are pivoted at 2 to the members 1, 1A and to the seat members 7, 7A at 5. The lugs 15E are fixed to the legs 3, 3A; the joints at 15C are of universal (i.e. 2-axis) kind, as are those at 15D. The rear legs 4A, 4B are pivotally attached at their bottom ends, to the members 1, in fittings which are illustrated in more detail in FIG. 11. The seat members 7, 7A are pivoted at 6 to the rear legs. The rear legs extend upwards beyond the pivots 6 to form back supports 4C, 4D.

All of the main elements of the volume frame and X-frames are of tubular light metal and are of square or rectangular section. Exposed ends are protected by plugs such as 20 (FIG. 4) of moulded plastics material. The top ends of the legs 3, 3A are left open and into them can be fitted the ends of the parts 8 which are linked by pivoted links 8A to the arm rests 9 the rear ends of which are pivoted at 9A to the back rests 4C, 4D; the parts 8 can thus be detached at their forward ends, the arm rests 9 moving up, and the seat is left laterally clear for the occupant to sit sideways. This facility is indicated in broken line in FIG. 4. The seat members 7, 7A have attached to them, a fabric seat 21. The seat back fabric 22 is mounted on bars 22A (see FIG. 7) which are in turn attached by fittings as at 22B to the back supports 4C, 4D and remain close to and parallel therewith: this form of attachment minimizes the extent to which the fabric to be cut for fitting and consequently lessens the possibility of the fabric fraying, as well as enabling the tension and shape of the seat-back to be selected for comfort. The bars 22A may be attached through resilience if a sprung seat-back be desirable.

Figure 7:
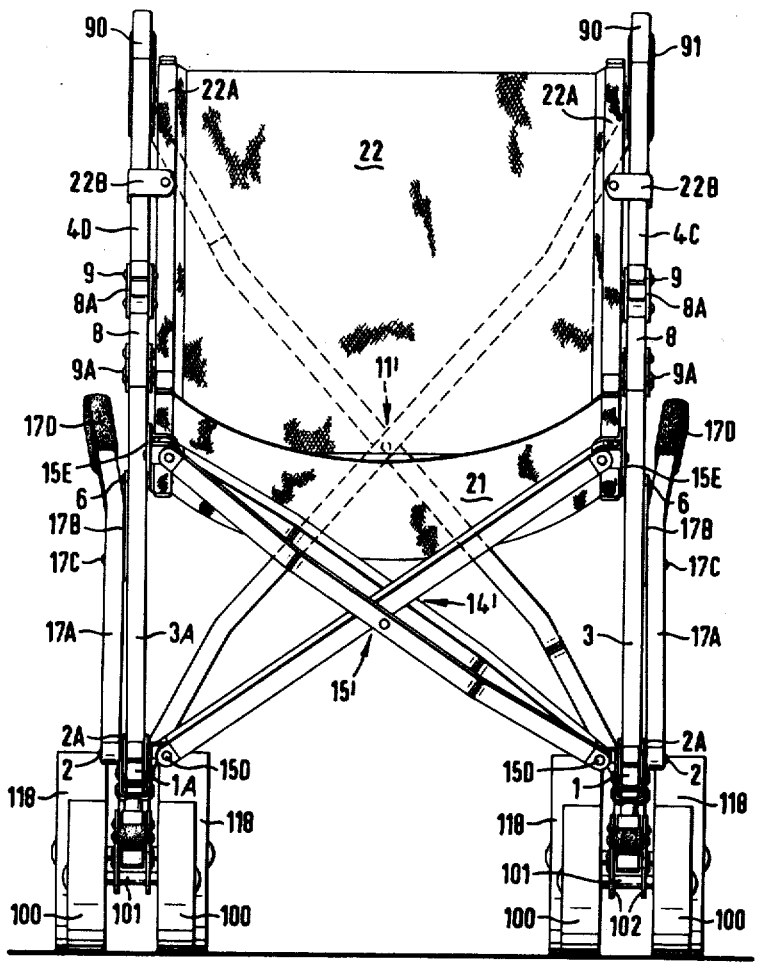
FIG. 7 is a front elevation of the chair of FIG. 4.

The upper end regions of the front legs 3, 3A are interconnected to lower ends of the rear legs 4A, 4B by the X-frame 14'. The end joints of this frame 14' (as also the other two X-frames) are, of course, in effect universal joints although the pivot axes are not accurately congruent and act as a second plurality of pivot connection means each having two degrees of pivotal freedom. The front ends of the X-frame 14' are connected in the vicinity of the pivots 15C and the lower ends in the vicinity of the pivots 4. The back support elements 4C, 4D are connected at 10A to the upper ends of the X-frame 11', the lower ends of which are connected at lower joints 10 to rearward extensions of the base elements 1. As viewed in side elevation (FIG. 4) it is seen that the X-frame 14', acts as a diagonal brace to the quadrilateral patterns formed by 1, 3, 7, 4A and 1A, 3A, 7A, 4B. As seen in FIG. 7, it is seen as a diagonal cross-brace to the lateral parallel plane frames defined by the front and rear legs, 3, 3A and 4A and 4B. It is also to be seen that the X-frame 11' affords diagonal cross-bracing laterally to the quadrilateral pattern observed in FIG. 7: thus bracing is effective to stiffen the seat-back supports 4C, 4D.

Control of extension and folding of the chair is effected as follows. Pivoted to the slides 16 are the elements 17A which, pivotally joined at 17C, are the parts 17B which are in turn pivoted at region 6 to the upper ends of the legs 4A, 4B coaxially with the attachment of the seat members 7, 7A. The parts 17A are extended to the handles 17D; in the extended situation the parts 17A and 17B are to a small extent at an angle which, in relation to the pivot 17C, is over a dead center, so that 17A, 17B, form in effect a toggle strut which braces the (side elevation of FIG. 4 concept) quadrilaterals 1, 3, 4A, 7, and 1A, 3A, 4B, 7A in the complimentary sense to the bracing previously mentioned attributed to the X-frame 14'. If the user is in front of the chair and facing it, he pulls on the handles 17D and by so doing, causes the collapse of the volume frame in all three dimensions, from its prismatic form as in FIG. 3, to the bundle configuration seen in FIG. 6. The strut (which is itself a toggle) 17A, 17B may be provided with locking means for the extended condition as in FIG. 4 (as well as or instead of the means later described) such as a latch made of resilient plastics material or such means may be a shaped ring, slidable over the part 17B and the handle so as to lock them in the extended condition of FIG. 4. A preferred form of lock is, however, seen in FIG. 10.

The foregoing describes the basic collapsible quadrilateral volume frame for an invalid chair. The following describes details which contribute to its practicability for that purpose. First, regard the handles for pushing. In order to minimizes the overall volume of the bundle (FIG. 6) configuration, and to provide two alternative positions for selection by the user, see FIG. 9. In this is seen a crooked handle made of an element 90 (corresponding to 4E of FIG. 3) with a comfortable moulded plastics grip 91. This element has a spigot end 92 with a double forked end 93. The end 92 is inserted in any one of four positions at 90°, into the top end of seat-back parts 4C, 4D. The slots of the forked end 93 correspond to the pivot pins at 10A. As seen by comparing the full and broken lines of FIG. 9, it can be seen that the handles may be re-positioned for collapse and transport, or for comfort.

In order to prevent inadvertent release of the handles, there may be provided a resiliently loaded ratchet or dog-tooth arrangement so that inadvertent relaxation by the user will not result in a handle unexpectedly twisting round, with accident possibilities: or some other simple safety device may be provided which will also afford the user optimal positions of use of the handles.

Suspension, with due regard to resilience both for the comfort of the occupant and to minimize localized loads imposed by irregularities of the road, or negotiating curbs or steps for example, is of considerable importance. When the chair is to be used for a person of adult weight, and especially if the use is in passages in a building or pathways in the open, it is desirable to be able to guide the wheeled chair directionally without tilting it. It is also desirable to distribute the "footprint" load. For these reasons, all the wheels are, as preferred, in twin form (for clarity see FIG. 7). There are, therefore, eight wheels but the description refers, with obvious meaning, to "wheel pairs" meaning twin wheels mounted coaxially, spaced only by the structure which they support.

FIG. 10 illustrates the arrangement of a resiliently mounted and fully castoring front wheel pair. A pair of resiliently tired wheels 100 are borne on an axle 101. The axle 101 is fixed in two side plates 102 of a rocking element which has a pivotal support at 102A attaching it (through a lug not shown) to a vertical square-sectioned tube 103 which is rotatable (for castoring movement) on a vertical hollow pin 105. The pin 105 has a small outward flange at 105B which bears fixedly against a larger flange 105A extending outwards from an inner boss 105C. The assembly 105, 105C is held resiliently by the flange 105A being nipped between a first rubber pad 106 and a second rubber pad 107, all held in compression within the channel sectioned fitting 2A which is riveted at 2B to the element 1. The tube 103 has pivotally attached to it at 108 a channel sectioned fitting 109 which houses in compression, a rubber block 109A which, when the wheel 100 is urged upwards and fitting 109 therefore forwards, acts as a resilient cushion between the fitting 109 and the tube 103, so that resilient suspension is provided. To control rebound resiliently, the plates 102 extend beyond tube 103, and the extension carries at 102B aa rubber pad 102C which also bears on the tube 103 and is compressed against it if the wheel 100 tends to move downwards. A screw 104 supports a flat washer 104A upwards, to bear against a pair of transverse pins 104B which are fixed in the tube 103, the pins 104B acting as a thrust bearing between the bottom of 105 and the tube 103.

It will be observed from FIG. 10 that the slide 16 abuts against the bracket 24. Advantage is taken of this large-scale Figure to illustrate a spring-lock, consisting of a fitting 16A housing a spring 16B pushing a round-nosed plunger 16C so as to engage a hole in the element 1. The plunger 16C is retractable by a wire 16D connecting it to a trigger 16E near the handle 12D, so that the slide 16 is locked in the extended configuration but can be released by means of the trigger for collapse of the structure.

Figure 11:
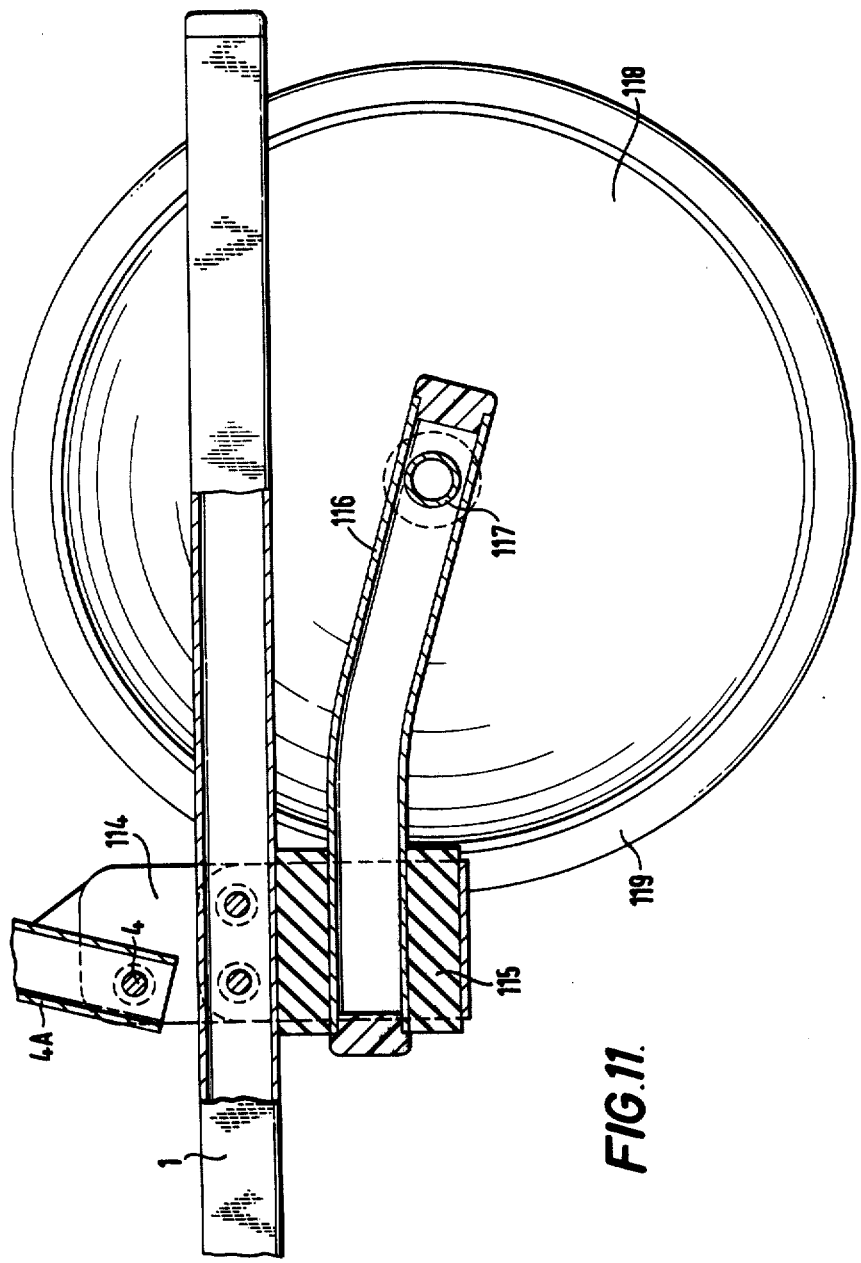
FIG. 11 illustrates the resilient suspension of a rear wheel pair.

Referring now to FIG. 11 the preferred suspension of the back wheels is illustrated. Brackets 114 are rigidly attached to the members 1, and they also anchor the pivot joints 4. The brackets 4A, of channel section, hold in initial compression rubber bushes 115 in which are nipped cantilever arms 116 extending rearwardly to support axles 117 on the ends of which are borne rear wheel pairs 118. The resilience of the bushes 115 affords vertical, and slight horizontal and torsional resilient suspension between the wheels 118 and elements 1. The wheels 100 are of less diameter than 118 whereby their freedom to castor is ensured by their clearance from the elements 1. The wheels preferably have somewhat broad flat treads, and their tires 119 are preferably formed of "sponge" plastics material with a resilient but smooth tread, all formed as one moulding and second to the moulded plastics wheels by adhesive or by being formed and cured in situ. Such brakes as may be necessary may be hand or foot controlled.

The wheel system above described is not an essential part of the invention and may be entirely varied, or substituted by runners (e.g. for snow), driven wheels or other devices, or if the chair be immobile may be entirely omitted. It is observed that the way in which resilience is proposed to be provided both for the front and rear wheels, allows for some elastic deflection laterally, i.e. out of vertical plane. This is of importance because the wheels are paired, and the lateral deflection so allowed, ensures to a large extent that the loading of a pair of wheels is eqaulized if the ground is uneven. The wheel pairs may be readily detachable, for example by their axles being held in slots in the parts 102 and 116 with any simple retaining means. The rear wheels may (as illustrated) be larger than the front wheels. If non-castoring wheels are used, then the wheels may be of uniform size but if one pair is to castor (e.g. the front wheels described) that pair is, conveniently, smaller so as to clear the elements 1.

It will be observed that the volume frame of FIG. 13 will enable a structure like that described with reference to the earlier Figures in which the structure is braced by three X-frames, to be achieved without the need for one of the X-frames to have sliding attachment. It then follows that the manner in which the user collapses, or erects and locks the chair (or like object) is different in that these operations are now achieved simply by operating three toggle-bars. However, FIG. 14 shows how the same basic volume frame can be extended and folded by a single lever. The probability is that this will not initiate extension or finalize folding since this would probably call for bearings and structure of unnecessary accurate finish and weight, ill-adapted for the purposes in mind.

Figure 12:
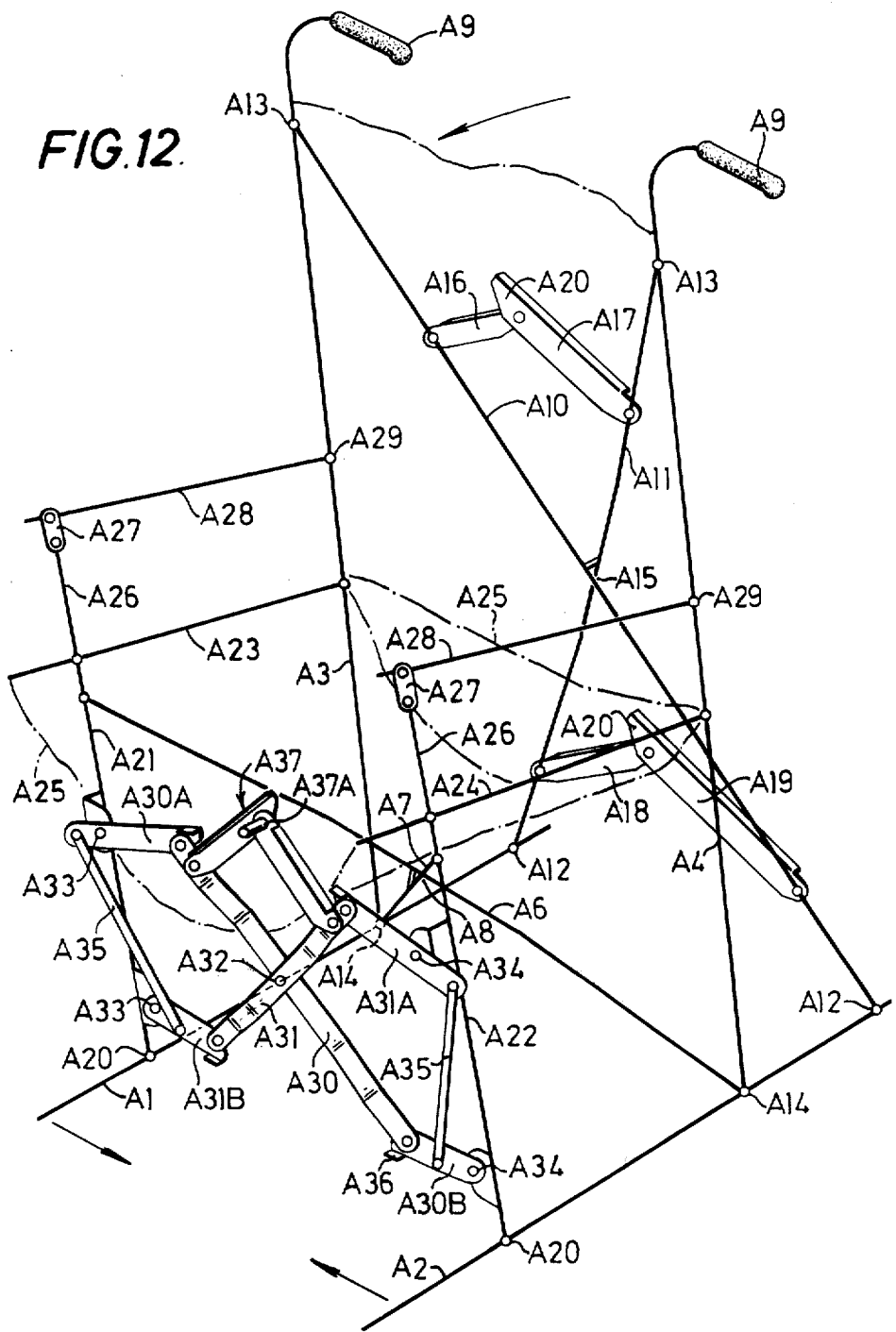
Figure 13:
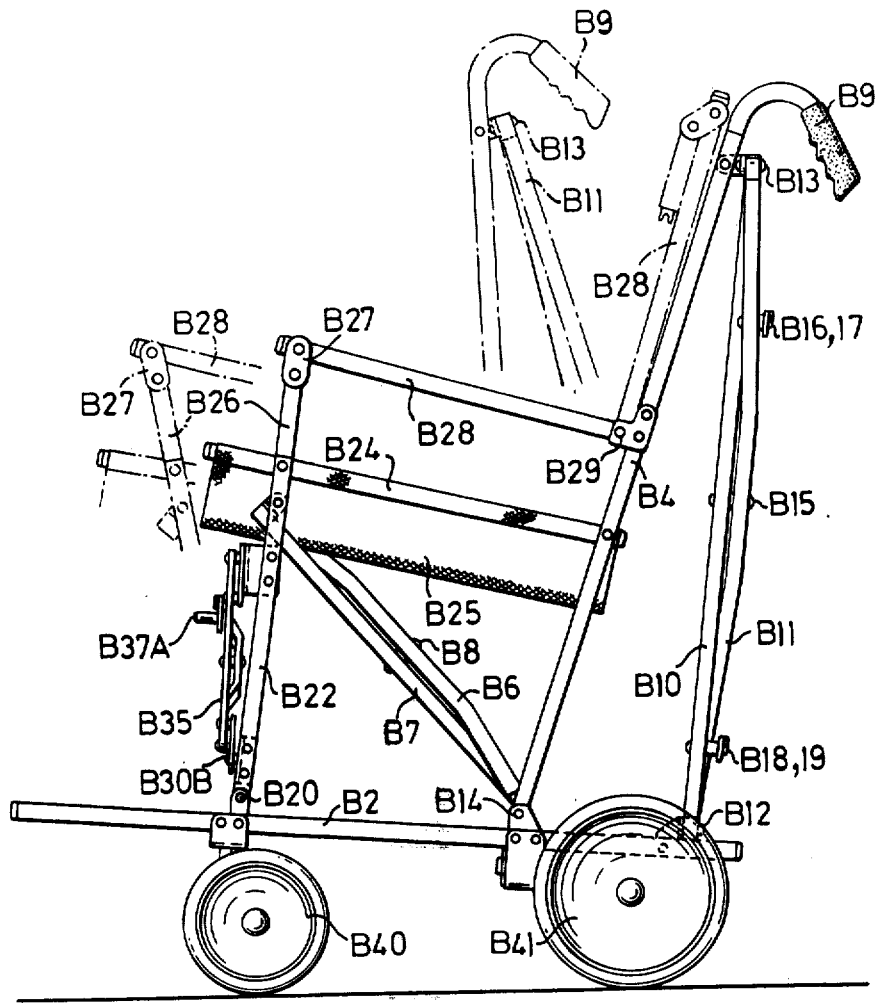
FIG. 13 shows such frame in structural form, fully extended.
Figure 14:
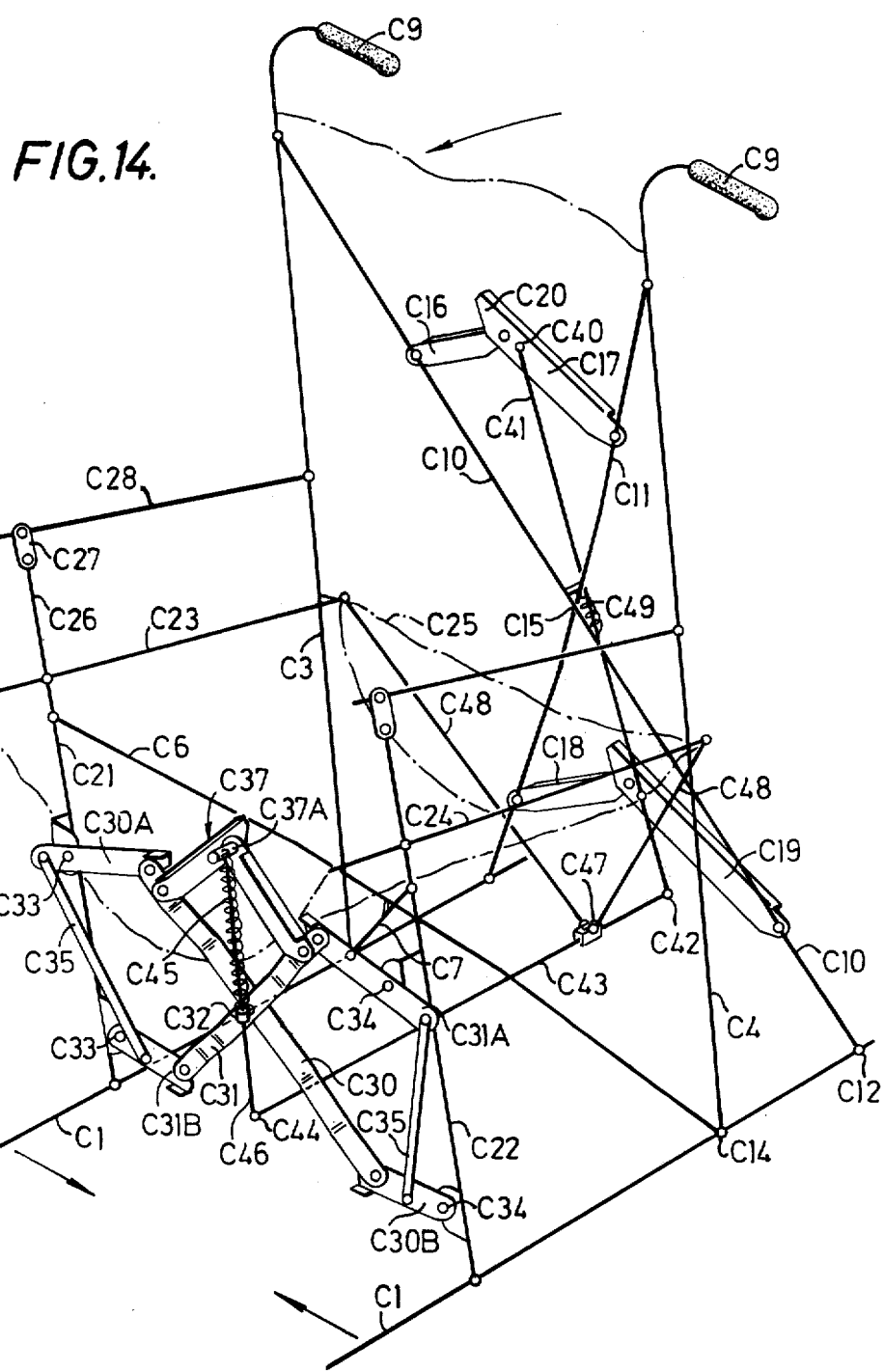
FIG. 14 is a diagrammatic illustration of a volume frame as in FIG. 12, with the addition of single control and occupant-weight control.

Turning to FIGS. 12, 13, and 14, like parts have the same references save that in FIG. 12 each is preceded by the letter "A", in FIG. 13 by the letter "B", and in FIG. 14 by the letter "C".

The volume frame of FIG. 12 (described in its nearly fully extended configuration) has two substantially parallel bottom members A1, A2 the ends of which are capable of having wheels fitted. Two rear legs A3, A4 extend upwards from pivot joints to members A1, A2 at A14. Also jointed at (or substantially at) A5 are the rear lower ends of a first X-frame consisting of two crossing elements A6, A7 interpivoted at A8. The legs A3, A4 are extended upwards to the handles A9. A second X-frame consisting of interpivoted crossed elements A10, A11 has its bottom ends pivotally joined to the bottom members A1, A2, at A12. The top ends of A10, A11 are pivoted at A13 to the extremities of the extensions of the legs A3, A4. The intersection of the elements A10, A11 is pivoted at A15. The X-frame A10, A11 is provided with tie means having ends of limited separability such as uppper toggle bar A16, A17 and a lower toggle bar A18, A19. These toggle bars are of known form, preferably being of L-section and having an end (as at A20) which when the toggle bar is extended and just past its dead-center acts as a lock when the toggle bar is in endwise compression. The toggle part A16 is pivoted to A10; A17 to A11; A18 to A11, and A19 to A10. It follows that when fully extended the second X-frame (A10, A11) is strongly braced and locked.

Pivoted at A20 to the members A1, A2, are two front legs A21, A22. X element A6 is pivoted to leg A21 near the upper end; A7 to leg A22 likewise. The front X-frame therefore cross-braces the front legs with the bottom members and also acts as a diagonal brace in the quadrilateral pattern (as viewed in side elevation) formed by A1, A3, and A21 or A2, A4 and A22, the quadrilateral in each respective case being completed by a seat bearer A23, A24. An indication of the fabric seat is given by the broken line A25. The front legs A21; A22 have upward extensions A26 (which may be socketed into the legs) which together with short links A27 and arm rests A28 form arms for the comfort and stability of the occupant but can be swung out of use by virtue of the rests A28 being pivoted at A29 to the rear legs A3, A4. When in position, the arms so constituted collapse with the other parts of the structure or they may be separately folded up.

There may be a further tie means, having two ends of limited separability such as a third X-frame which braces the front legs A21, A22 and virtually completes the volume frame as a rigid structure. This X-frame consists of two crossing elements A30, A31 which are interpivoted at A32, and four end parts, namely A30A and A30B pivoted to A30 and A31A, A31B likewise pivoted to A31. These end parts are jointed at four pivots A33, A34, respectively to the front legs A21, A22. The end parts A30A and A31A are extended beyond their respective pivots A33, A34 and such extensions are linked by rods A35 to their corresponding parts, i.e. A30A is linked to A31B, and A31A to A30B. It follows that relative angular movements of A30 and A31 about A32, are necessarily accompanied by those movements of A30A, A30B, A31A, and A31B which "break" the respective toggle element (in folding) or "make" it (in extension). The pivot joints of these toggle elements are, preferably, themselves locked in toggle manner when extended, as by lugs A36. Thus the X-frame as a whole when extended, is rigid in compression end-loads on its elements. In addition and particularly for ease in operation, the two crossing elements A30 and A31 are interconnected by a toggle bar indicated at A37 which is similar in form (and may be identical in production) with the upper and lower toggle bars e.g. A16, A17 at the rear of the structure. The toggle bar A37 has an operating knob at A37A; by pulling this knob up the toggle A37 is "broken" and in "breaking" pulls up the upper parts of A30 and A31, thus moving A30A anticlockwise, A31A clockwise and by reason of the rods A35 moving A31B and A30B in opposite angular sense. Pushing down on knob A37A has the opposite effect and thus extends and finally locks this articulated collapsible X-frame.

In referring to FIG. 13, this is a side elevation of the volume frame of FIG. 12 fully extended in full line, with broken-line indications of the partially-collapsed condition approximating to that of FIG. 12. The references can be read across from FIG. 12 to FIG. 13 simply by substitution of "B" for "A" as a prefix.

In addition to the parts which characterize the volume frame, it is seen in FIG. 13 that there are front wheels at B40 and rear wheels at B41. These are mounted through resilient suspension and the front wheels B40 are free to castor. The wheels are preferably twins.

In the above described example, collapsing is done by pulling up the knob B37A and "breaking" or dislodging upward the two rear toggles from their locked position. The handles B9 are then moved (relatively) forward and the whole of the volume frame collapses both vertically and laterally, until all the main parts lie close together as a bundle.

Referring now to FIG. 14 the same numeral references are used where applicable, as in FIG. 12, but with the prefix letter "C". One feature shown in FIG. 14 is as follows. Pivoted at C40 to the toggle element C17 is a rod C41 the lower end of which is pivoted at C42 to the rear end of a beam C43 which extends front to back in the frame, clear beneath the seat part C25. The front end of the beam C43 is pivoted at C44 to a rod C46 which slides in a bush which is mounted by the pivot at C32 up to the knob C37A. Between the bush at C32 and the knob C37A is a compression spring C45 mounted on the rod C46 and thus tending to "break" the toggle C37. To the beam C43, at C47 are pivoted two compression seat struts C48 which interattach the beam C43 with the two seat bearers C23, C24. The seat bearers are restricted (by slides not shown) to move up and down against the legs C3, C4. At C49 is provided another short spring so arranged as to resist downward movement of the rod C41 by reacting against one or both X-elements C10, C11.

The action is as follows. Collapsing of the volume frame involves the movements previously described, but by reason of rod C41 beam C43 and the struts C48, the seat bearers C23, C24, rise somewhat; simultaneously the spring C45 (the downward load in rod C46 being removed "breaks" the toggle C37. Collapse of the volume frame is thus initiated. Now consider extension of the structure. A configuration approximating to full extension having been reached, the knob C37 is pushed down and rear toggles are locked or (as is the main purpose of the refinement) the occupant sits down, so that his weight, taken through the bearers C23, C24, pushes the beam C43 down whereby the rod C41 "makes" and locks the rear toggles and by similar action via rod C46, "makes" and locks the toggle C37 and with it the third X-frame.

Figure 15:
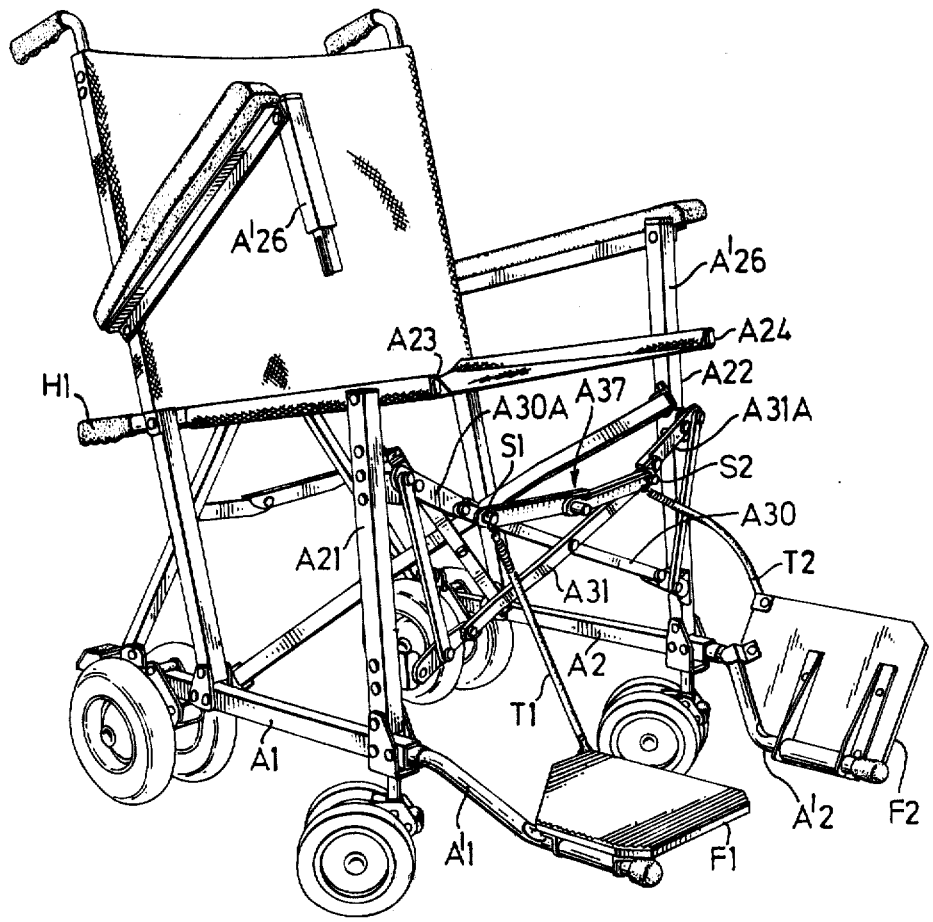
FIG. 15 is a perspective view of a chair which is basically similar to that shown in FIG. 12.

The wheeled chair shown in FIG. 15 is basically similar to that shown in FIG. 12 and therefore only the differences will be described but references corresponding to those used with reference to FIG. 12 will be used where appropriate.

The bottom members A1, A2 are tubular and open-ended at the front to receive and support rigid, forwardly directed arms A1', A2'. These arms provide horizontal pivot supports for respective foot platforms F1, F2: F1 is shown in its horizontal operative position whereas F2 is shown rotated out of the way of a prospective user. When the foot platforms are operative, they fully extend respective flexible non-extensible ties T1, T2, shown pivotally connected to respective studs S1, S2, the inner ends of which provide pivots for the outer ends of the toggle bar A37. Thus an occupant of the chair, when using the foot platforms F1, F2 tends to hold the X-frame extended by keeping the end parts A30A, A31A, aligned with the intersecting elements A30, A31.

The seat bearers A23, A24 are extended rearwardly to support handles by which the chair can be pushed, or folding assisted, one such handle H1 being shown.

The front legs A21, A22 are socketed at their tops to receive the lower ends of respective arm rest pillars A'26, the armrests themselves being pivotally connected at their rear ends on the back supports of the chair structure.

Figure 16:
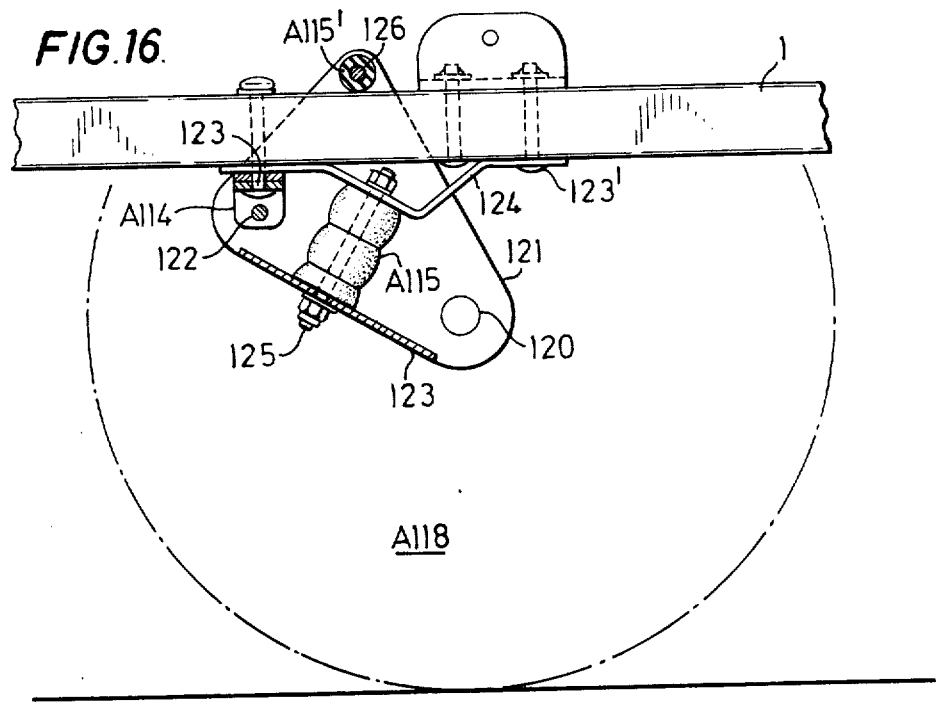
FIG. 16 is another form of resilient wheel suspension.

FIG. 16 shows a possible resilient suspension for each front or rear wheel, but for ease of comparison with the description of FIG. 11, corresponding reference numerals prefixed by the letter A will be used on corresponding parts.

Thus a wheel A118, when borne by the suspension, would be carried by its axle in an arm 121 of channel section, having substantially triangular side plates. These are suspended from a pivot 122 extending transversely under one of the horizontal base members 1 of the structure through holes in the side plates from a mounting bracket A114 held by a cross pin 123 in holes in the structure member 1.

A rubber compression bush A115 acts between the base 123 of the arm 121 and a strip 124, and is retained by a bolt 125. The strip 124 is held at one end by the cross pin 123 and at the other end by another cross pin 123' in holes in the member 1.

Downward pivoting of the arm 121 is limited by a rubber bush A115' supported transversely over the member 1 by a rod 126 retained in holes in the upper corners of the side plates of the arm 121.

Figure 17:
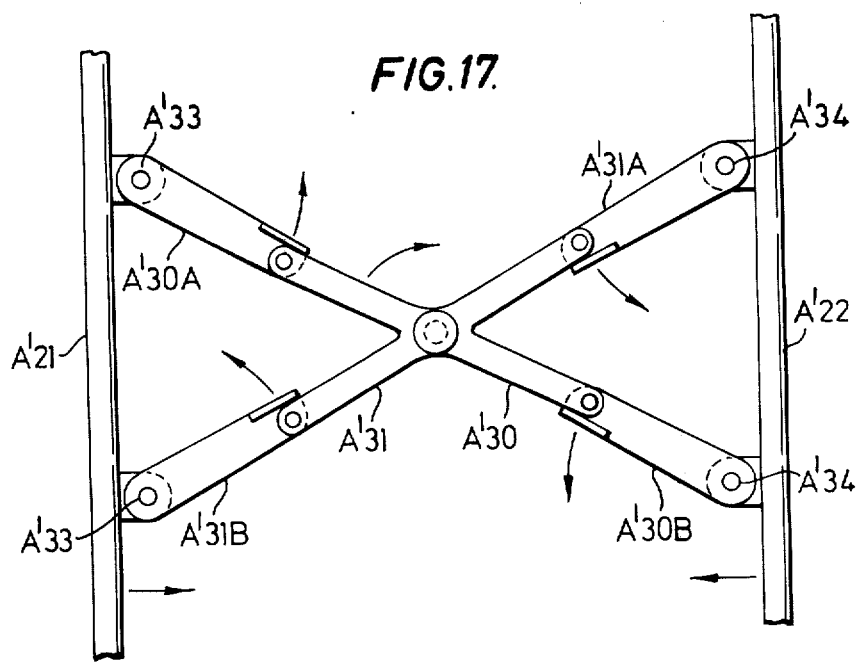
FIG. 17 is another form of X-frame.

FIG. 17 shows a variant of the X-frame. This frame has the equivalent of toggles in its arms. Comparison will be made with the third or front X-frame shown in FIG. 12 and corresponding reference numerals prefixed by A' instead of A will be used on corresponding parts, but it is to be understood that the X-frame in FIG. 17 may replace any of the X-frames shown in the embodiments.

Referring to FIG. 17, the X-frame braces the front legs A'21, A'22. The frame is partly in the form of two crossing elements A'30, A'31 but these are rigid with one another, being provided by a single casting. When the X-frame is in a locked extended condition, the elements A'30, A'31 are aligned respectively with toggle end parts A'30A, A'30B, and A'31A, A'31B, each of which is pivoted at one end on the element A'30 or A'31 as the case may be, and at the other end on the adjacent front leg A'21 or A'22 at one of the pivots A'33, A'34. Rotation of the casting, having the elements A'30, A'31, in the clockwise sense in FIG. 17 "breaks" the corresponding toggle connections with the end parts A'30A, A'30B, A'31A and A'31B, and permits the legs A'21, A'22 to approach one another.

I claim:

1. A volume frame foldable in two dimensions mutually at right angles, comprising, when extended, a pair of opposite sides of corresponding form, each such side comprising elongate elements and a first plurality of pivot connection means, the elements of each such side including at least an upright front leg, an element which is an upright back leg, and a rigid element which joins the front leg to the back leg through said pivot connection means, said pivot connection means being a pair spaced along said rigid element and disposed at two corners of a theoretical quadrilateral of which said front leg and said back leg are opposite sides, each pivot connection means of said pair affording a horizontal axis directed from side to side of the volume frame, thereby enabling folding of the frame in one of said dimensions by pivoting of each said front leg about one horizontal axis and pivoting of each said back leg about another horizontal axis in the back to front sense of the frame with concurrent mutual approach of said front leg, said back leg and said rigid element in each said side frame, the frame further comprising:

at least one collapsible X frame and a second plurality of pivot connection means each having two degrees of pivotal freedom including pivotal freedom about a horizontal axis directed from side to side of the volume frame, said second plurality of pivot connection means being spaced in the side frames from said first plurality of pivot connection means, which X frame lies in a plane extending in the lateral sense of the volume frame and inclined to a front plane and a back plane which contain, respectively, each said front leg and each said back leg, said X frame having a pair of lower ends and a pair of upper ends, of which X frame one such lower end and one such upper end are each pivotally connected by a respective pivot connection means of said second plurality thereof to one of said opposite sides of the volume frame whereas the other such lower end and the other such upper end are each pivotally connected by a respective pivot connection means of said second plurality thereof to the other of said opposite sides of the volume frame, thereby enabling folding of the frame in the other of said dimensions by collapse of said X frame; and at least one tie means having two ends of limited separability by which ends said tie means are connected in the volume frame in triangulating relationship with said X frame for supporting the volume frame when extended.

2. A volume frame as claimed in claim 1 in which said tie means comprises:

first releasable stress-bearing elements extending laterally of the volume frame and connected therein for resisting folding of said X frame until release, and second releasable elongate stress-bearing elements extending generally in the back to front sense of the volume frame and connected therein for resisting back to front folding of each said front leg and each said back leg until release.

3. A volume frame as claimed in claim 1 in which said X frame is pivotally connected by said lower ends thereof to each said back leg.

4. A volume frame as claimed in claim 1 in which said X frame is pivotally connected to each said front leg and each said back leg, and pivots on each said back leg about an axis substantially the same as each said back leg pivots during back to front folding of the volume frame.

5. A volume frame as claimed in claim 1 in which each of said opposite sides comprises four elongate elements joined serially by said first plurality of pivot connection means to form a closed quadrilateral space frame including the front leg, the back leg, the said rigid element and a second rigid element extending generally parallel to, but spaced from, said rigid element.

6. A volume frame as claimed in claim 5 in which ground wheels are mounted thereon and adapt the volume frame for use as the frame of a wheel chair, a fabric seat extends between said pair of opposite sides and is attached thereto, each said back leg has an upward extension, and a fabric back support extends between each said upward extension and is attached thereto.

7. A volume frame as claimed in claim 1 in which each of said opposite sides includes an intermediate elongate element connected to the corresponding first plurality of pivot connection means of said front leg and said back leg of the respective side, a rearward extension of said intermediate elongate element, such extension and such intermediate elongate element of one of said opposite sides corresponding with such extension and such intermediate elongate element of the other of said opposite sides, there being a further X frame means connected for pivoting during back to front folding on said rearward extension and on said back leg of each of said opposite sides, and for bracing the volume frame externally when extended.

8. A volume frame as claimed in claim 7 in which releasable locking means are provided on said further X frame for resisting folding thereof in the lateral sense of the volume frame until release.

9. A volume frame as claimed in claim 1 in which each of said opposite sides comprises four elongate elements joined serially by said first plurality of pivot connection means to form a closed quadrilateral space frame, one of such elements in each of said opposite sides being an intermediate element connected to said front leg and back leg of the respective opposite side, and there are a plurality of slide connections, there being one such slide connection to each said intermediate elongate element, and a plurality of tie means comprising stress-bearing elements and further comprising releasable locking means, each of said opposite sides and each of said slide connections being connected to a respective tie means which, until release of said locking means, locks the respective slide connection in relation to the volume frame.

10. A volume frame as claimed in claim 1 in which said tie means comprises releasable stress-bearing elements, which, until release, resist folding of the volume frame.

11. A volume frame foldable in two dimensions mutually at right angles, comprising, when extended, a pair of opposite sides of corresponding form, each such side comprising elongate elements and a first plurality of pivot connection means, such elements of each such side including at least one element which is an upright front leg, an element which is an upright back leg, and two generally parallel spaced apart rigid elements which join the front leg to the back leg through said pivot connection means, said pivot connection means being a pair spaced along each said rigid element and disposed at two corners of the quadrilateral formed thereby of which said front leg and said back leg are opposite sides, each pivot connection means of said pair affording a horizontal axis associated with each rigid element and directed from side to side of the volume frame, thereby enabling folding of the frame in one of said dimensions by pivoting of each said front leg about one said horizontal axis and pivoting of each said back leg about another horizontal axis in the back to front sense of the frame with concurrent mutual approach of said front leg, said back leg and said rigid element in each said side frame, the frame further comprising:

at least one collapsible X frame and a second plurality of pivot connection means each having two degrees of pivotal freedom including pivotal freedom about a horizontal axis directed from side to side of the volume frame, which X frame lies in a plane extending in the lateral sense of the volume frame and inclined to a front plane and a back plane which contain, respectively, each said front leg and each said back leg, said X frame having a pair of lower ends and a pair of upper ends, of which X frame one such lower end and one such upper end are each pivotally connected by a respective pivot connection means of said second plurality thereof to one of said opposite sides of the volume frame whereas the other such lower end and the other such upper end are each pivotally connected by a respective pivot connection means of said second plurality thereof to the other of said opposite sides of the volume frame, thereby enabling folding of the frame in the other of said dimensions by collapse of said X frame; and at least one tie means having two ends of limited separability by which ends said tie means are connected in the volume frame in triangulating relationship with said X frame for supporting the volume frame when extended.

12. A volume frame as claimed in claim 11 in which said X frame is pivotally connected by said lower ends thereof to each said back leg.

13. A volume frame as claimed in claim 11 including a plurality of slide connections between corresponding elements of said opposite sides and corresponding ends of said X frame, and a plurality of tie means comprising releasable stress-bearing elements, each said tie means being connected to a respective slide connection for supporting the slide connection in relation to the volume frame when extended until release of said tie means.

14. A volume frame as claimed in claim 11 in which one pair of corresponding ends of said X frame is retained for sliding on corresponding elongate elements of said opposite sides, and a plurality of tie means comprising stress-bearing elements and further comprising releasable locking means, each said tie being connected to a respective one of said opposite sides and to one of said corresponding ends of said X frame to lock the same in relation to the volume frame until release of said locking means.

15. A collapsible wheel chair frame foldable in two dimensions mutually at right angles, comprising, when extended, a pair of opposite sides of corresponding form, each such side comprising four elongate elements and a first plurality of pivot connection means, the elements of each such side including an upright front leg, an upright back leg, and an upper and a lower generally parallel spaced apart rigid elements which join the front leg to the back leg through said pivot connection means, said pivot connection means being a pair spaced along each said rigid element and disposed at the four corners of the quadrilateral formed thereby of which said front leg and said back leg are opposite sides, each pivot connection means of said pair affording a horizontal axis associated with each rigid element and directed from side to side of the chair frame, thereby enabling folding of the frame in one of said dimensions by pivoting of each said front leg about one said horizontal axis and pivoting of each said back leg about another horizontal axis in the back to front sense of the frame with concurrent mutual approach of said front leg, said back leg and said rigid element in each said side, the frame further comprising:

a first collapsible X frame and a second plurality of pivot connection means each having two degrees of pivotal freedom including pivotal freedom about a horizontal axis directed from side to side of the chair frame, which X frame lies in a plane extending in the lateral sense of the chair frame and inclined downwardly from a front plane to a back plane which contain, respectively, each said front leg and each said back leg, said first X frame having a pair of lower ends and a pair of upper ends, of said first X frame one such lower end and one such upper end are pivotally connected by a respective pivot connection means of said second plurality thereof to one of said opposite sides of the chair frame whereas the other such lower end and the other such upper end are pivotally connected by a respective pivot connection means of said second plurality thereof to the other of said opposite sides of the chair frame, thereby enabling folding of the chair frame in the other of said dimensions by collapse of said X first frame; an upward extension of each said back leg forming a frame for a backrest; a rearward extension of each said lower rigid element;

a second X frame extending between said upward extension and said rearward extension and connected for pivoting during folding of said chair frame and positioned to brace the upward extension when the chair frame is extended; and at least one tie means having two ends of limited separability by which ends said tie means are connected in the chair frame in triangulating relationship with one of said X frames for supporting the chair frame when extended.

16. The wheel chair frame of claim 15 in which said one tie means extends between the front legs and a second tie means extends in triangulating relationship between two of the members of said second X frame.

* * * * *